United States Patent [19]

Kitazawa

[11] Patent Number: 5,105,212
[45] Date of Patent: Apr. 14, 1992

[54] MOTOR-DRIVEN CAMERA

[75] Inventor: Toshiyuki Kitazawa, Tokyo, Japan

[73] Assignee: Asahi Kogaku Kogyo Kabushiki Kaisha, Tokyo, Japan

[21] Appl. No.: 563,700

[22] Filed: Aug. 7, 1990

[30] Foreign Application Priority Data

Aug. 25, 1989 [JP] Japan .................... 1-219994

[51] Int. Cl.$^5$ .................... G03B 1/18
[52] U.S. Cl. .................... 354/173.1; 354/212; 354/214
[58] Field of Search .................... 354/173.1, 204, 205, 354/206, 212, 214

[56] References Cited

U.S. PATENT DOCUMENTS

| 3,598,033 | 8/1971 | Sasaki . | |
|---|---|---|---|
| 3,735,683 | 5/1973 | Umeda . | |
| 3,895,389 | 7/1975 | Arai . | |
| 3,946,409 | 3/1976 | Toyoda . | |
| 4,162,837 | 7/1979 | Haragushi . | |
| 4,196,992 | 4/1980 | Shono . | |
| 4,240,733 | 12/1980 | Ueda et al. . | |
| 4,294,527 | 10/1981 | Hashimoto et al. . | |
| 4,383,747 | 5/1983 | Tezuka et al. . | |
| 4,522,477 | 6/1985 | Iwashita et al. .................... | 354/173.1 |
| 4,963,905 | 10/1990 | Haraguchi et al. .................... | 354/173.1 X |

FOREIGN PATENT DOCUMENTS

| 0202073 | 11/1986 | European Pat. Off. . |
| 3146720 | 8/1982 | Fed. Rep. of Germany . |
| 2101756 | 1/1983 | United Kingdom . |
| 2171809 | 9/1986 | United Kingdom . |

OTHER PUBLICATIONS

An English Abstract of Japanese Publication No. 60-131529.
A copy of the French Search Report.

Primary Examiner—A. A. Mathews
Attorney, Agent, or Firm—Sandler, Greenblum, & Bernstein

[57] ABSTRACT

A motor-driven camera including a sun gear which is rotated in the forward and reverse directions in accordance with the rotation of a motor in the forward and reverse directions, a charge gear which is in mesh with a gear grain of a shutter charge system, a winding gear which is in mesh with a gear train of a film winding system, a first rotatable planet gear mechanism which is provided around the sun gear to mesh with the winding gear in accordance with the rotation of the sun gear in one direction, and a second rotatable planet gear mechanism which is provided around the sun gear to mesh with the charge gear in accordance with the rotation of the sun gear in the other direction.

16 Claims, 8 Drawing Sheets

MOTOR-DRIVEN CAMERA

BACKGROUND OF THE INVENTION

1. Field of the Invention

The present invention relates to a motor-driven camera.

2. Description of the Related Art

In a conventional motor-driven single-lens reflex camera, independent motors are usually provided for winding and rewinding film and for driving a mirror, a shutter and a diaphragm, in addition to a motor for the AF system. In a recent camera, a high speed shutter having a shutter speed of 1/4000~1/8000 second has been realized. The charge load of such a high speed shutter is 2~4 times that of a prior shutter having a shutter speed of 1/2000 second, and accordingly, a high-power motor is required in view of the increased charge load. On the other hand, a high speed film winding system in which more than five frames of film are advanced in one second (more than 5 frames/sec.) has been developed. In such a high speed film winding system, a high-power motor (coreless motor) is used.

To respond to the need of the increased shutter speed and the film winding, it is necessary to use large high-power motors for the film winding system and for the driving system of the mirror, shutter and the diaphragm. This however results in a large and expensive camera. It is very difficult to realize both a high speed shutter system and a high speed winding system at an inexpensive cost.

SUMMARY OF THE INVENTION

A primary object of the present invention is to provide a motor driven camera in which a high speed shutter system and a high speed winding system are realized at an inexpensive cost.

Another object of the present invention is to provide a motor-driven camera in which the shutter charge and the film winding are effected by a single common motor.

Still another object of the present invention is to provide a motor-driven camera in which the film rewinding is also effected by the single common motor mentioned above.

In a conventional camera, the winding and rewinding of the film are effected by one motor and the driving of the mirror, the shutter and the diaphragm are effected by another motor. Conversely, in the present invention, the shutter charge and the film winding are both effected by a single high-power motor, so that both the shutter speed and the film winding speed can be increased.

In the present invention, basically, the winding of the film and the shutter charge are both effected by a single common motor depending upon the different rotation directions thereof. With this concept, only the common motor is an expensive high-power motor, such as a coreless motor, to realize both high-speed shutter and high-speed winding.

According to an embodiment of the present invention, in addition to the winding of the film and the shutter charge, the rewinding of the film is also effected by the single common motor mentioned above. Namely, according to an aspect of the present invention, there is provided a motor-driven camera in which winding and rewinding operations of a film and a shutter charge are effected by a common motor, comprising a sun gear which is rotated in the forward and reverse directions in accordance with the rotation of the common motor in the forward and reverse directions, a charge gear which is in mesh with a gear train of a shutter charge system, a rewinding gear which is in mesh with a gear train of a film rewinding system, a winding gear which is in mesh with a gear train of a film winding system, a first rotatable planet gear mechanism which is provided around the sun gear to mesh with the winding gear in accordance with the rotation of the sun gear in one direction, a second rotatable planet gear mechanism which is provided around the sun gear to selectively mesh with the charge gear or the rewinding gear in accordance with the rotation of the sun gear in the forward or reverse direction, a first preventing means for preventing the second planet gear mechanism from engaging with the rewinding gear when the film is wound by the winding gear, and a second preventing means for preventing the first planet gear mechanism from engaging with the winding gear when the film is rewound by the rewinding gear.

If the components which constitute the film rewinding mechanism are removed from the above-mentioned arrangement, only the winding of the film and the shutter charge are effected by the common motor. Thus according to another aspect of the present invention, there is provided a motor-driven camera comprising a sun gear which is rotated in the forward and reverse directions in accordance with the rotation of a motor in the forward and reverse directions, a charge gear which is in mesh with a gear train of a shutter charge system, a winding gear which is in mesh with a gear train of a film winding system, a first rotatable planet gear mechanism which is provided around the sun gear to mesh with the winding gear in accordance with the rotation of the sun gear in one direction, and a second rotatable planet gear mechanism which is provided around the sun gear to mesh with the charge gear in accordance with the rotation of the sun gear in the other direction.

Since it takes a relatively long time to rewind the film, it is possible to utilize not only the beginning stage of the operation of the motor, but also the regular operation stage subsequent thereto. Therefore an inexpensive motor which may be used for other mechanism can be practically used in the present invention.

BRIEF DESCRIPTION OF THE DRAWINGS

The invention will be described below in detail with reference to the accompanying drawings, in which.

DESCRIPTION OF THE PREFERRED EMBODIMENTS

Figure 8:
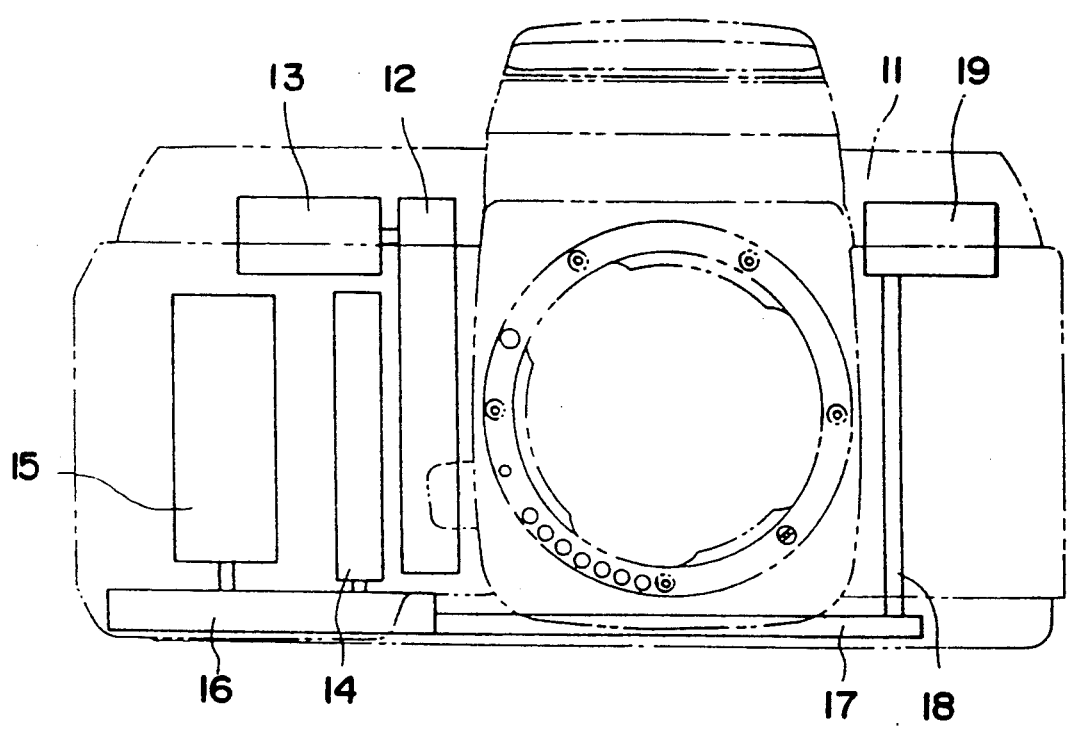

In the illustrated embodiment, the winding of the film, the rewinding of the film and the shutter charge are all effected by a common single motor. FIG. 8 shows a whole construction of a drive system of a camera according to this embodiment.

In FIG. 8, the single-lens reflex camera 11 has a mirror/diaphragm mechanism 12 on the left side of a mirror box as viewed from the front. The mirror/diaphragm mechanism 12 is driven by a mirror/diaphragm motor 13.

A shutter mechanism 14 is provided on the side of the mirror/diaphragm mechanism 12. The shutter mechanism 14 is independent from the mirror/diaphragm mechanism 12, unlike a driving system in the prior art in which the shutter mechanism 14 is integral with the mirror/diaphragm mechanism 12. A drive motor (common motor) 15 which is a high-power coreless motor is provided in a film winding spool, so that the axis of the drive motor extends in the vertical direction. The film winding and rewinding/shutter charge mechanism 16 is driven by the drive motor 15. The film winding and rewinding/shutter charge mechanism 16 drives the shutter mechanism 14 when the drive motor 15 rotates, for example, in the forward direction. When the drive motor 15 rotates in the reverse direction, a rewinding fork is rotated through an idle gear train 17, a through shaft 18 and a rewinding mechanism 19.

One of the features of the present invention is directed to the film winding and rewinding/shutter charge mechanism 16. The subject of the present invention is not directly directed to the mirror/diaphragm mechanism 12 and the mirror/diaphragm motor 13, both per se known, and accordingly, no detailed explanation thereof will be given herein.

The following discussion will be directed to the film winding and rewinding/shutter charge mechanism 16, with reference to FIGS. 1 through 4.

Figure 1:
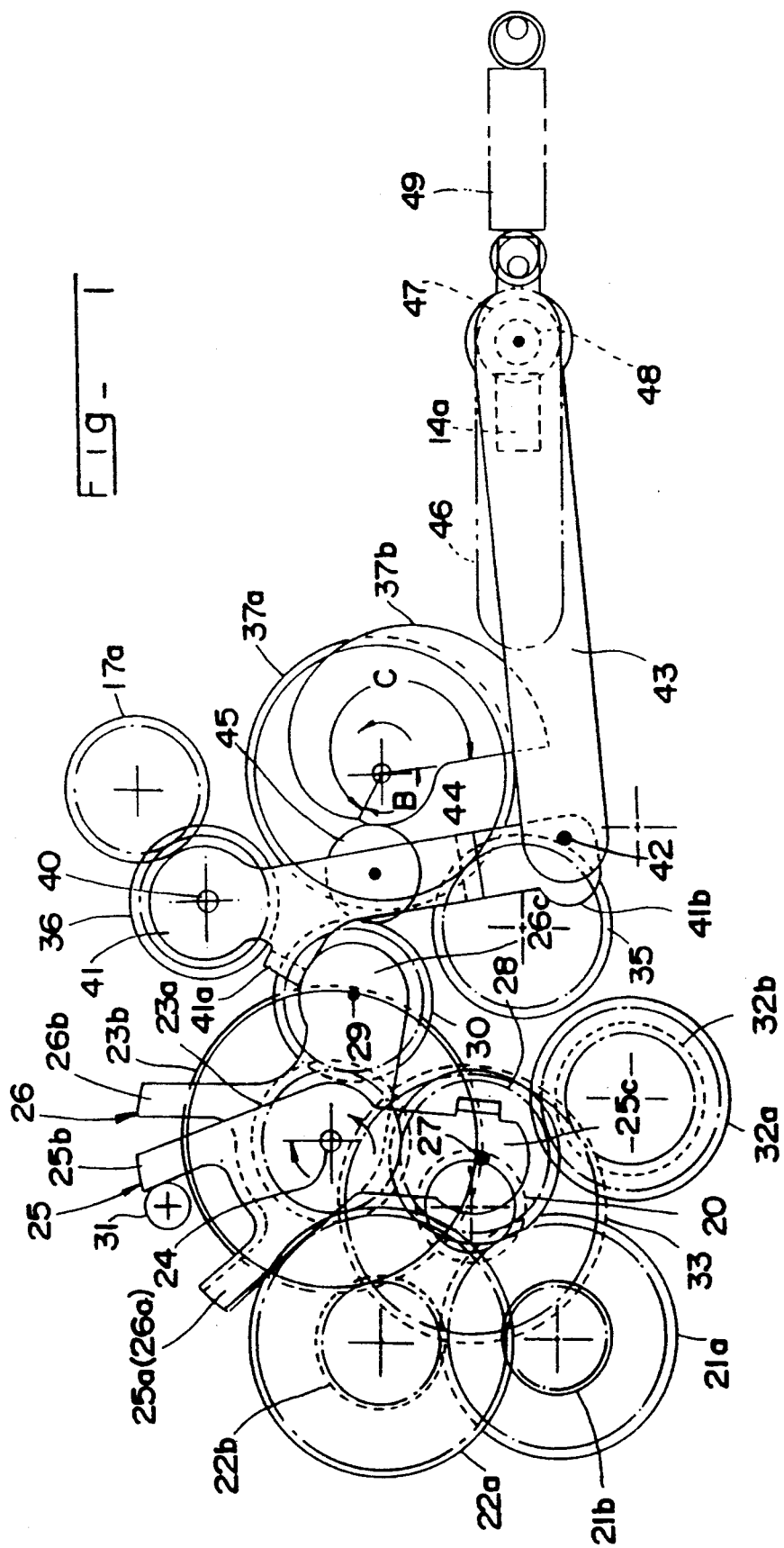
FIGS. 1, 2, 3 and 4 are plan views of a film winding and rewinding mechanism and a shutter charge mechanism in a motor-driven camera according to the present invention, shown in different operational positions.

FIG. 1 shows an initial position in which the shutter charge commences upon the completion of the winding of the film. A motor pinion 20, which is secured to the output shaft of the drive motor 15, is connected to a gear 23b, which is coaxial to and integral with a sun gear 23a through a reduction gear train (gears 21a, 21b, 22a and 22b), so that when the motor pinion 20 rotates in the forward and reverse directions, the sun gear 23a is rotated in the reverse and forward directions, respectively.

To the shaft 24 of the sun gear 23a are pivoted a first planet lever 25 and a second planet lever 26, which come into frictional contact with the sun gear 23a. The first and second planet levers 25 and 26 swing (rotate) in accordance with the rotation of and in the same direction as the sun gear 23a.

Figure 6:
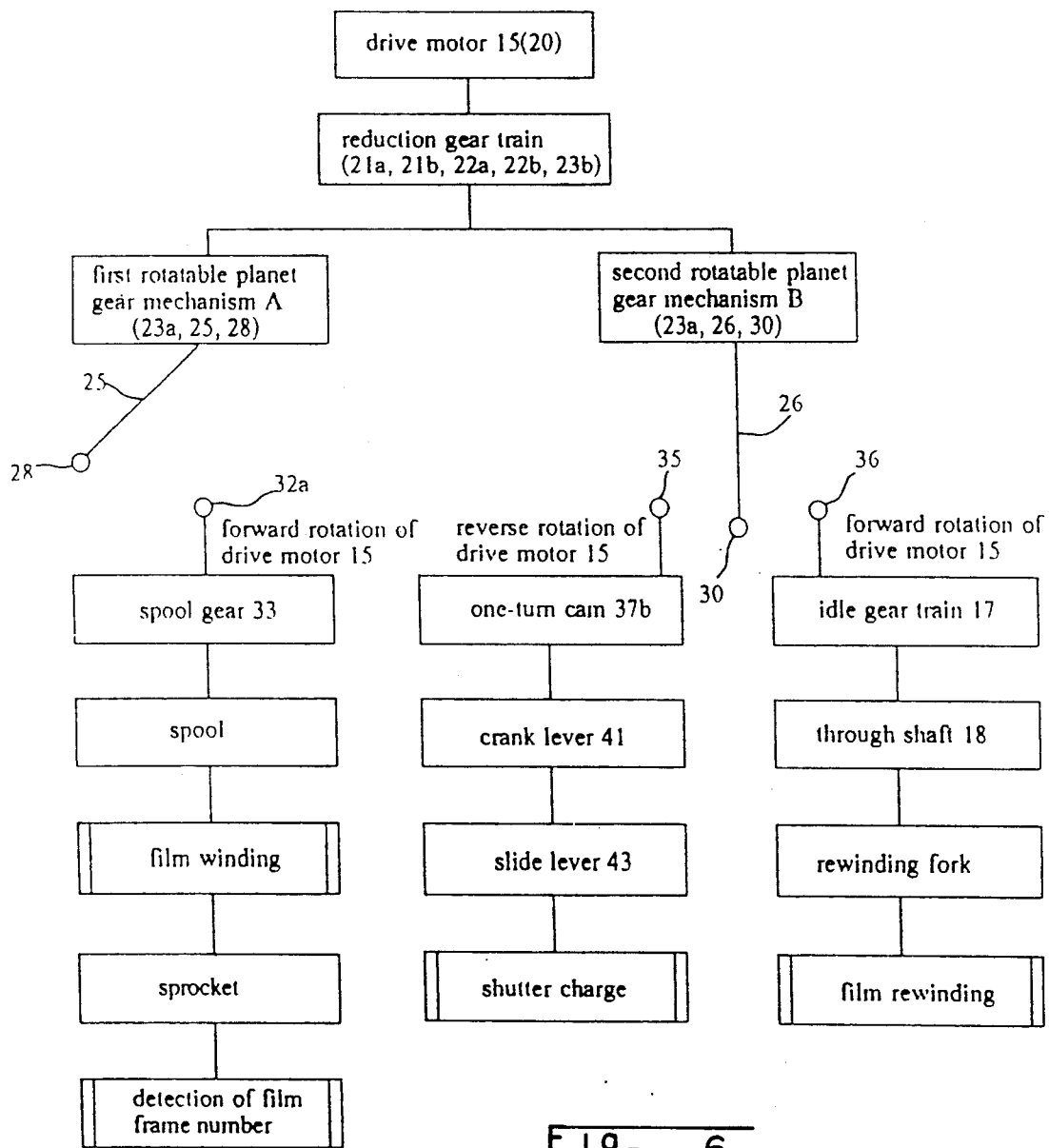
FIG. 6 is a flow chart of the operations of a drive system in a motor-driven camera according to the present invention.

The first planet lever 25 has a pair of swing movement restricting legs 25a and 25b, and a gear supporting arm 25c which rotatably supports a first planet gear 28 through a shaft 27. The gear supporting arm 25c has an engagement restricting projection 25d formed thereon. Similarly, the second planet lever 26 has a pair of swing movement restricting legs 26a and 26b, and a gear supporting arm 26c which rotatably supports a second planet gear 30 through a shaft 29. A rotation restricting pin 31 is provided between the swing movement restricting legs 25a and 25b and between the swing movement restricting legs 26a and 26b. The first and second planet gears 28 and 30 are always in mesh with the sun gear 23a. The sun gear 23a, the first planet lever 25 and the first planet gear 28 constitute a first planet gear mechanism A (FIG. 6). Similarly, the sun gear 23a, the second planet lever 26 and the second planet gear 30 constitute a second planet gear mechanism B (FIG. 6).

The first planet gear 28 moves between an engagement position in which it engages with the winding idle gear 32a and a disengagement position in which the first planet gear 28 is disengaged from the winding idle gear 32a in accordance with the direction of the rotation (swing movement) of the first planet lever 25. The gear 32b, which is coaxial to and integral with the winding idle gear 32a, is always in mesh with a spool gear 33, which is integral with the winding spool, so that when the winding idle gear 32a rotates, the film is wound.

The second planet gear 30 selectively engages with a charge idle gear 35 and a rewinding idle gear 36 in accordance with the direction of the rotation (swing movement) of the second planet lever 26. The charge idle gear 35 is always in mesh with a one-turn gear 37a which has a charge cam 37b integral therewith.

The rewinding idle gear 36 has a crank lever 41 coaxially pivoted to a shaft 40 thereof. The crank lever 41 is provided on its free end with a slide lever 43 which is pivoted at its one end to the crank lever 41 through a shaft 42. The crank lever 41 rotatably supports at the intermediate portion thereof a roller 45 through a shaft 44. The roller 45 engages the charge cam 37b. On the opposite end of the slide lever 43 is provided a slide restriction pin 47 which is fitted in a slide groove 46 formed on a stationary portion of the camera. A charge pin 48 is coaxially secured to the slide restriction pin 47. The charge pin 48 engages with a shutter lever 14a of the shutter mechanism 14, so that when the slide lever 43 moves left from the initial position in FIG. 1, the shutter is charged through the shutter lever 14a. Numeral 49 designates a tensile spring 49 for biasing the slide lever 43 in the right hand direction in FIG. 1.

The rewinding idle gear 36 is always in mesh with the first idle gear 17a of the idle gear train 17, so that when the rewinding idle gear 36 rotates, the rewinding fork is rotated through the through shaft 18 and the rewinding mechanism 19.

The crank lever 41 has an engagement restriction projection 41a which projects between the second planet gear 30 and the rewinding idle gear 36 to prevent the second planet gear 30 from engaging with the rewinding idle gear 36 in a position shown in FIG. 1.

Figure 5A:
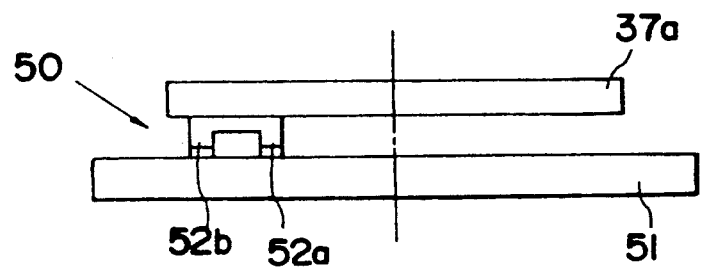
FIGS. 5A and 5B are a front elevational view, respectively, and a plan view of a rotational angle detection switch of a charge cam.
Figure 5B:
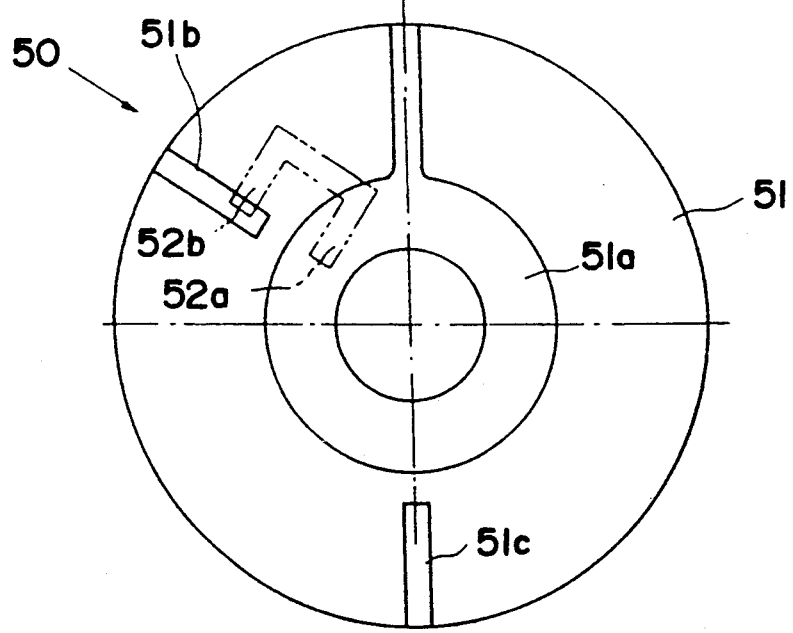

The charge cam 37b charges the shutter when it rotates in the counterclockwise direction by an angle of 240° from the initial position shown in FIG. 1. The one-turn gear 37a has an angle detection switch 50 which detects the angular displacement of 240° (charge completion angle) mentioned above and the one turn (360°) of the charge cam 37b. FIGS. 5A and 5B show an example of the angle detection switch 50. The angle detection switch 50 has a stationary substrate 51 which has thereon an annular common land 51a having a center located on the center of rotation of the one-turn gear 37a and two detection lands 51b and 51c corresponding to the angles of 240° and 360°, respectively. The one-turn gear 37a has a ground terminal 52a which is always in contact with the annular common land 51a and a detection terminal 52b which selectively comes into contact with the detection lands 51b and 51c and which is electrically connected to the ground terminal 52a. The angular displacement of the charge cam 37b is detected by detecting the connection of the annular common land and the detection land 51b or the detection land 51c.

Figure 7:
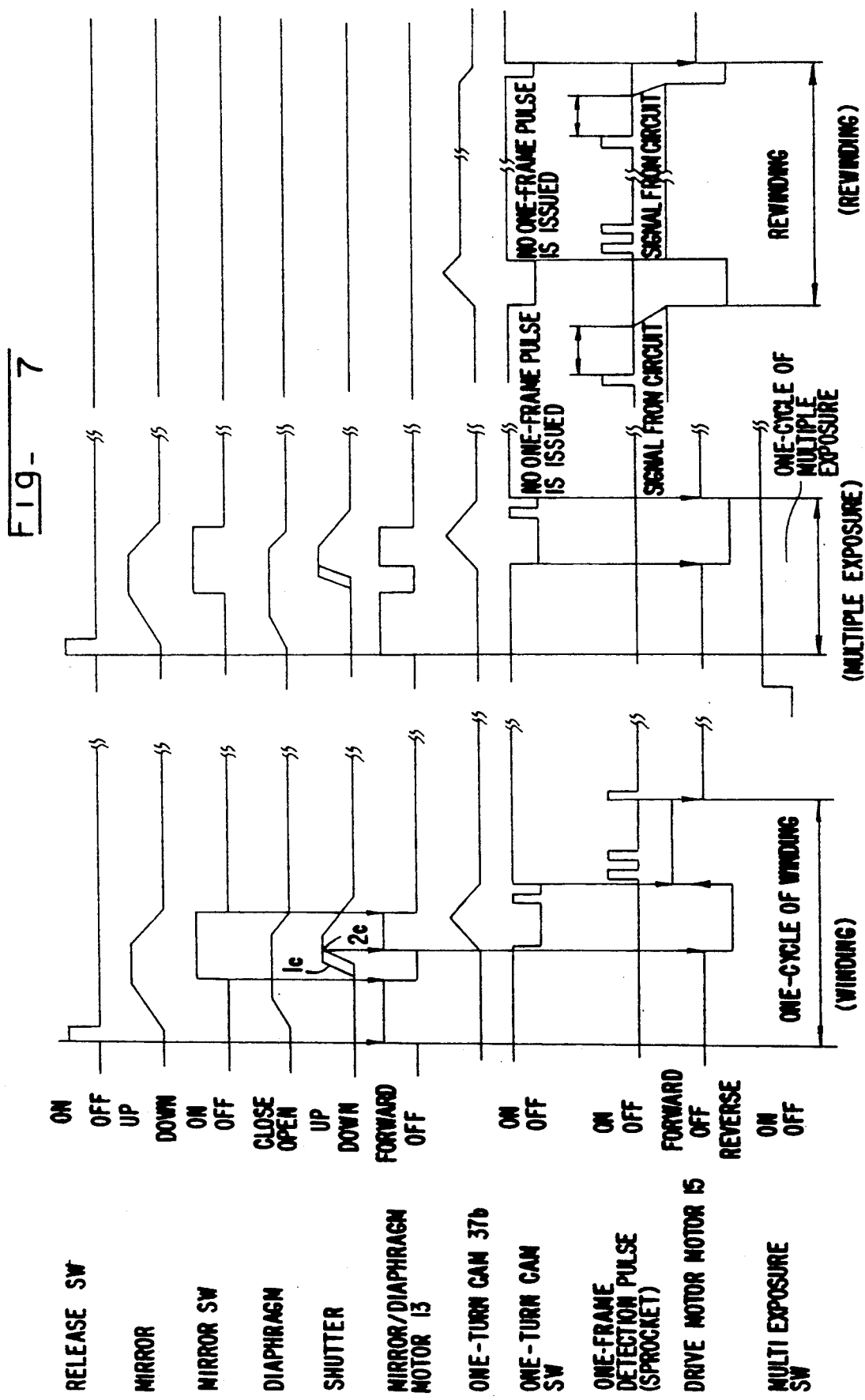
FIG. 7 is a timing chart of the operations of a drive system in a motor-driven camera shown in FIG. 6; and, FIG. 8 is a front elevational view of the construction of a motor-driven camera according to the present invention.

The motor-driven camera as constructed above operates as follows (FIGS. 6 and 7).

First, the winding operation will be described below. When the shutter is released in a position shown in FIG. 1, the mirror/diaphragm motor 13 drives the mirror/diaphragm mechanism 12 to move the focal-plane shutter. As is well known, in a focal-plane shutter, the leading curtain and the trailing curtain move with a predetermined distance therebetween corresponding to the shutter speed. When a trailing curtain switch 2c (FIG. 7) is made ON by the completion of movement of the trailing curtain, the mirror/diaphragm motor 13 operates, so that the mirror is returned to its initial position by the mirror/diaphragm mechanism 12.

Figure 2:
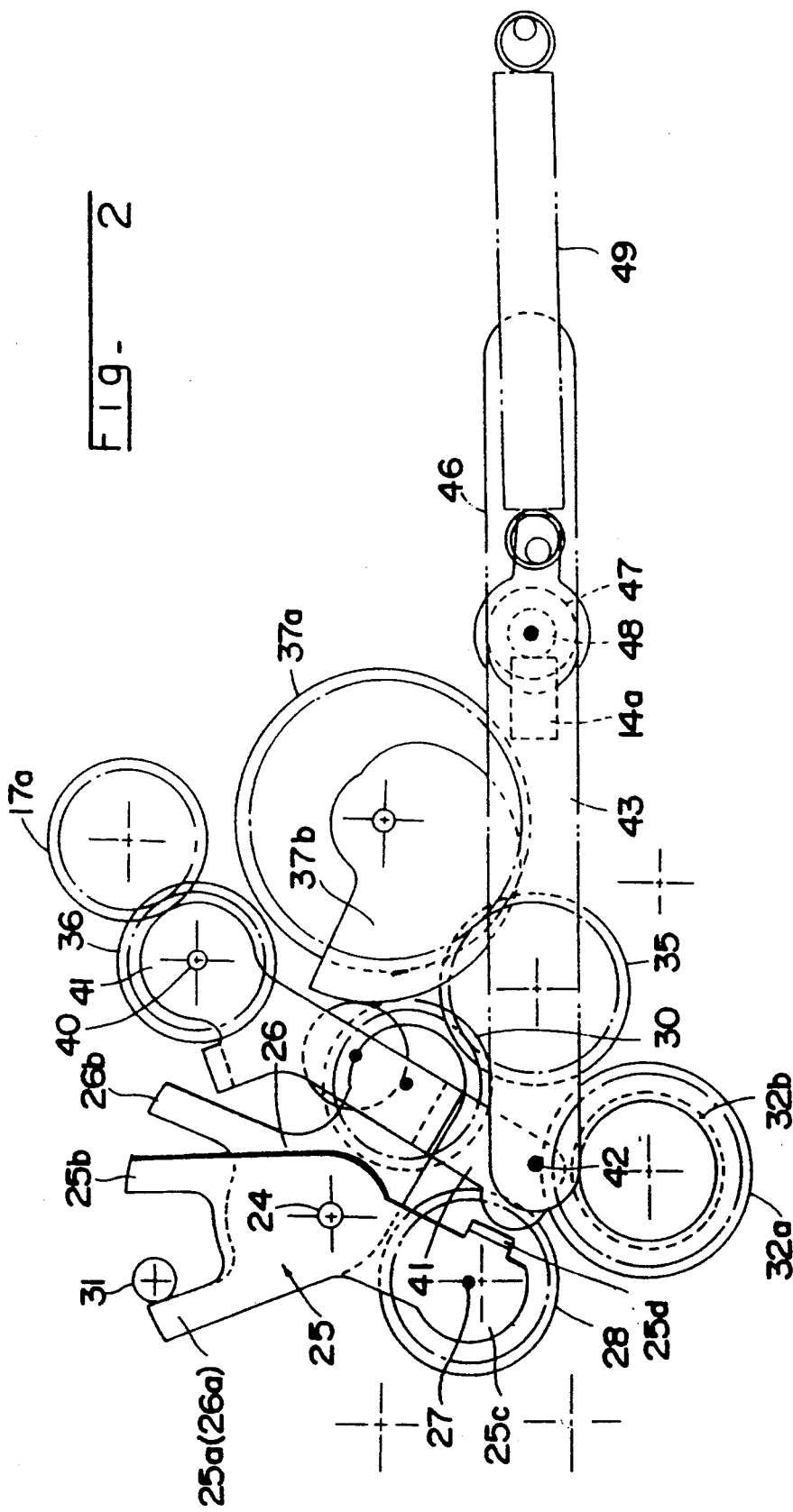

As soon as the trailing curtain switch 2c is made ON, the drive motor 15 is reversed (counterclockwise direction in FIG. 1). As a result, the sun gear 23a is rotated in the forward direction (clockwise direction in FIG. 1) through the gear train between the motor pinion 20 and the sun gear 23a, so that the first and second planet levers 25 and 26 are rotated in the same direction. The first and second planet levers 25 and 26 stop rotating when the respective swing movement restriction legs 25a and 26a abut against the rotation restriction pin 31, as shown in FIG. 2. In this state, the second planet gear 30 is in mesh with the charge idle gear 35, so that the first planet gear 28 is disengaged from the winding idle gear 32a. As a result, the rotational movement of the sun gear 23a in the forward direction is transmitted to the one-turn gear 37a through the second planet gear 30 and the charge idle gear 35.

When the one-turn gear 37a rotates in the counterclockwise direction, the charge cam 37b pushes the roller 45 of the crank lever 41 to rotate the crank lever 41 about the axis of the rewinding idle gear 36 in the clockwise direction. As a result, the slide lever 43 moves left in FIG. 1, so that the charge pin 48 pushes the shutter lever 14a to charge the shutter mechanism 14. The completion of the charge is detected by the rotation detection switch 50 which detects the establishment of the connection of the detection terminal 52b and the detection land 51b. Thus, the charge section C of the charge cam 37b corresponds to the angle (about 240°) between the detection land 51c and the detection land 51b. The charge cam 37b further rotates in the same direction until the detection terminal 52b comes into contact with the detection land 51c, that is, until one-turn of the charge cam 37b is detected. When the charge cam 37b rotates by one turn, the drive motor 15 stops (FIG. 3), and then rotates in the reverse direction (clockwise direction). The crank lever 41 is rotated in the counterclockwise direction by the tensile spring 49 when the roller 45 comes to the non-charge section B of the one-turn gear 37a (FIG. 3).

Figure 3:
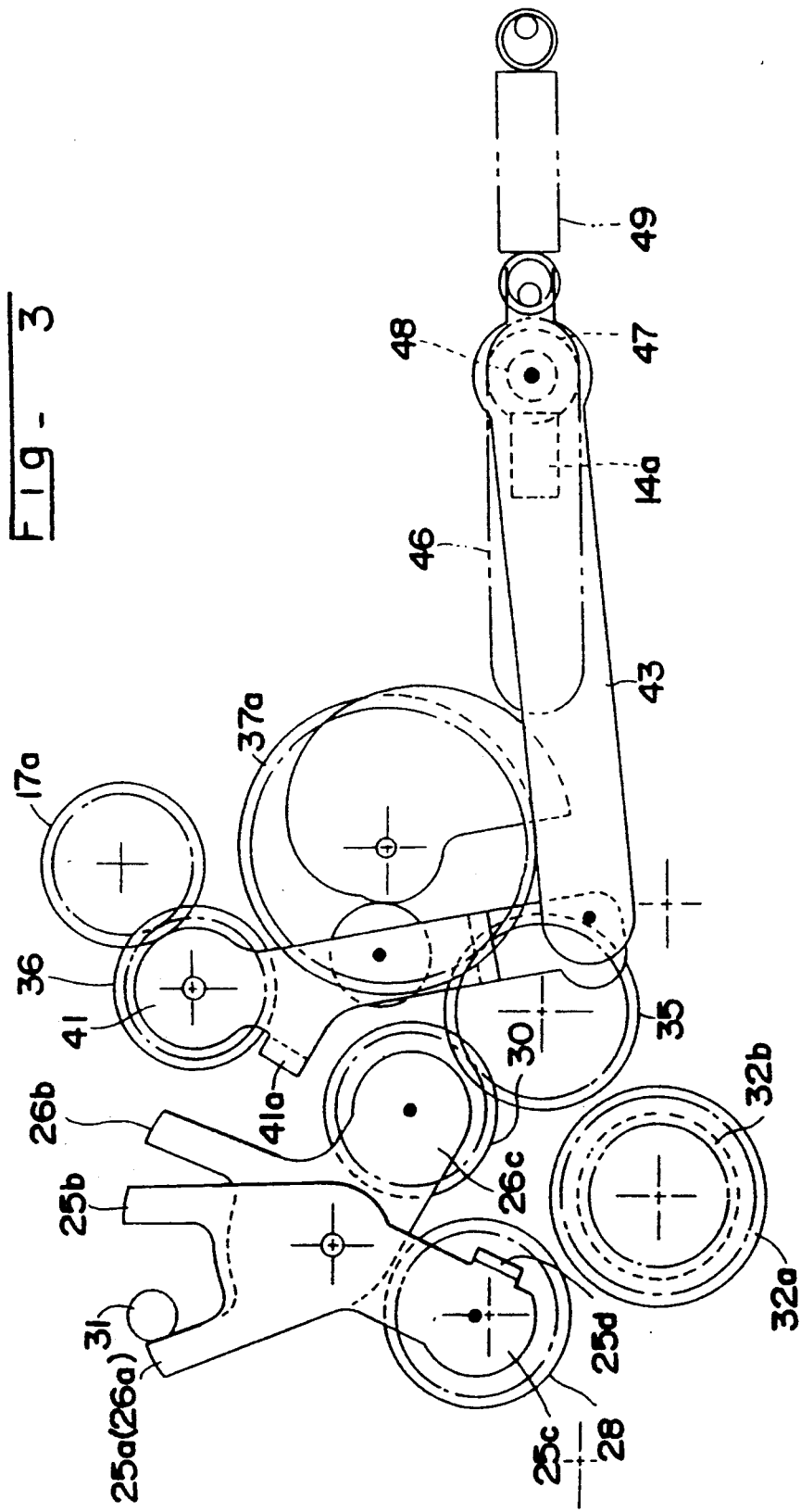
Figure 4:
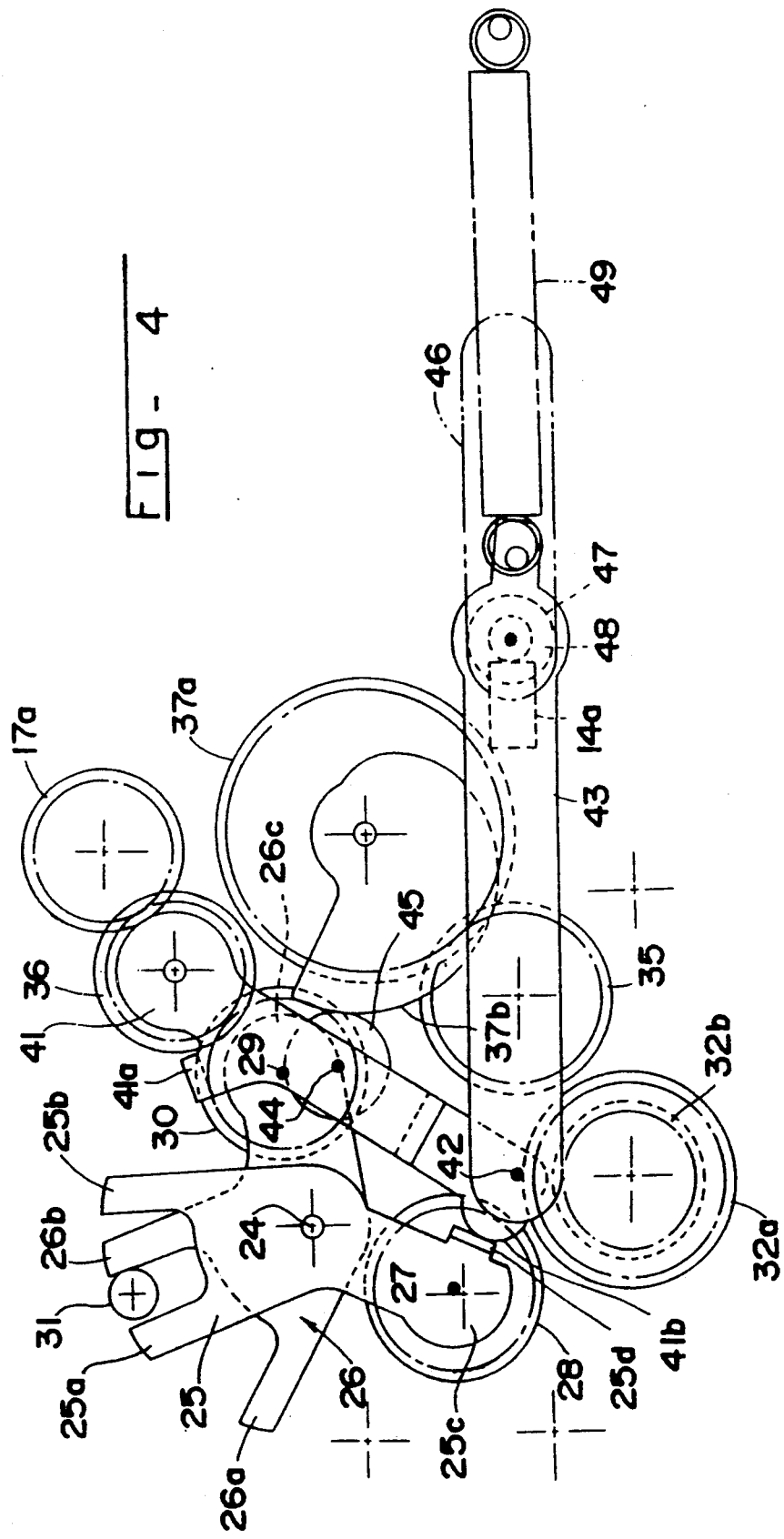

When the drive motor 15 rotates in the forward direction from the position shown in FIG. 3, the sun gear 23a is reversed in the counterclockwise direction, so that the first planet lever 25 and the second planet lever 26 are rotated in the counterclockwise direction. In this state, since the crank lever 41 is located in one of the extremities of the angular displacement in the counterclockwise direction, the engagement restriction projection 41a comes into contact with the gear supporting arm 26c of the lever 26 which swings in the counterclockwise direction, so that no engagement of the second planet gear 30 and the rewinding idle gear 36 takes place. Accordingly, neither the rewinding idle gear 36 not the first idle gear 17a rotate, so that no rewinding of the film through the idle gear train 17 occurs.

When the first planet lever 25 rotates in the counterclockwise direction, the first planet gear 28 is in mesh with the winding idle gear 32a (FIG. 1). As a result, the rotation of the sun gear 23a is transmitted to the gear 32b through the first planet gear 28 and the winding idle gear 32a, so that the spool gear 33 rotates. Thus, the rotation of the pinion 20 of the drive motor 15 is transmitted to the spool gear 33, so that the film is wound by the spool. The quantity of advance of the film is detected by a one-frame detection pulse which is emitted in accordance with the rotation of the sprocket which is engaged by the perforations of the film. When eight perforations (one frame) are counted, the drive motor 15 stops rotating. This is the normal winding operation.

The following discussion will be directed to the rewinding operation.

The rewinding operation is commenced when no one-frame detection pulse is detected within a predetermined period of time in the course of the above-mentioned winding operation. That is, when the film end is detected, the drive motor 15 stops rotating and then reverses. When the motor pinion 20 is reversed, the charge cam 37b rotates in the counterclockwise direction, similar to the above-mentioned winding operation. The difference of the rewinding operation from the winding operation is that in the rewinding operation, the drive motor 15 stops rotating and then rotates in the forward direction when the charge cam 37b rotates through about 240°. The detection is effected by the detection terminal 52b which comes into contact with the detection land 51b. Thus, the drive motor 15 rotates in the forward direction when the terminal end of the charge section C of the charge cam 37b is in contact with the roller 45 of the crank lever 41. When the roller 45 of the crank lever 41 comes into contact with the terminal end of the charge section C of the charge cam 37b, the crank lever 41 is in an end position of the rotation in the counterclockwise direction, as shown in FIG. 2, and accordingly, the front projection 41b of the crank lever 41 is in contact with the engagement restriction projection 25d of the first planet lever 25 to prevent the latter from rotating in the counterclockwise direction.

Therefore, if the first and second planet levers 25 and 26 tend to rotate in the counterclockwise direction as a result of the forward rotation of the drive motor 15, neither the rotation of the first planet lever 25 in the same direction nor the engagement of the first planet gear 28 and the winding idle gear 32a take place. Consequently, the winding idle gear 32a, and accordingly, the spool gear 33 are maintained to be free. When the second planet gear 30 is rotated in the counterclockwise direction, the second planet gear 30 engages with the rewinding idle gear 36. As a result, the rotation of the sun gear 23a is transmitted to the second planet gear 30, the rewinding idle gear 36, the first idle gear 17a, the idle gear train 17, the through shaft 18, the rewinding mechanism 19 and the rewinding fork.

When the rewinding of the film is finished, since no one-frame detection pulse is emitted within a predetermined space of time, the completion of the rewinding of the film is detected, so that the drive motor 15 stops rotating. Thereafter, the drive motor 15 reverses to rotate the sun gear 23a in the forward direction, so that the first and second planet levers 25 and 26 rotate in the clockwise direction. As a result, the second planet gear 30 engages with the charge idle gear 35, so that the one-turn gear 37a rotates in the counterclockwise direction. Thus, the one-turn gear 37a and the charge cam 37b rotate in the counterclockwise direction from the position shown in FIG. 2. When the one-turn gear 37a and the charge cam 37b rotate by about 120°, the detection terminal 52b comes into contact with the detection terminal 51c, so that the return of the one-turn gear 37a to the initial position is detected. In response to the detection signal, the drive motor 15 stops rotating. The rotation of the sun gear 23a in the forward direction causes the second planet lever 26 to rotate in the same direction to disengage the second planet gear 30 from the rewinding idle gear 36, so that the idle gear train 17 becomes free. Consequently, the rewinding fork becomes free, and accordingly, the film can be easily taken out and new film can be easily loaded.

The following description will be directed to the multiple exposure operation.

In the multiple exposure, a plurality of shutter charges are effected without winding the film. The multiple exposure is effected only by reversing the drive motor 15 without rotating the same in the forward direction. Therefore, when a multiple exposure switch is made ON, the drive motor 15 reverses only, unlike the normal winding operation in which the drive motor 15 is reversed every time the shutter is released to rotate the one-turn gear 37a by one turn thereby to charge the shutter and then the drive motor 15 is rotated in the forward direction to wind the film.

When the shutter is released in the multiple exposure photographing operation, the mirror/diaphragm motor 13 drives the mirror/diaphragm mechanism 12 to move the shutter. As a result, when the trailing curtain switch 2c is made ON, the drive motor 15 is reversed. Consequently, the sun gear 23a is rotated in the forward direction (clockwise direction in FIG. 1) through the gear train including the gears between the motor pinion 20 and the sun gear 23a, so that the first and second planet levers 25 and 26 are rotated in the same direction. The first and second planet levers 25 and 26 stop rotating when the respective rotation restriction legs 25a and 26a come into contact with the rotation restriction pin 31, as shown in FIG. 2. In this state, the second planet gear 30 engages with the charge idle gear 35, and the first planet gear 28 is disengaged from the winding idle gear 32a. As a result, the rotation of the sun gear 23a in the forward direction is transmitted to the one-turn gear 37a through the second planet gear 30 and the charge idle gear 35.

When the one-turn gear 37a rotates in the forward direction, the charge cam 37b pushes the roller 45 of the crank lever 41 to rotate the crank lever 41 about the axis of the rewinding idle gear 36 in the clockwise direction. As a result, the slide lever 43 moves left, so that the charge pin 48 pushes the shutter lever 14a to charge the shutter mechanism 14. The completion of the charging is detected by the detection terminal 52b which comes into contact with the detection terminal 51b. Therefore, the charge section C of the charge cam 37b corresponds to the angle between the detection land 51c and the detection land 51b. A further rotation of the charge cam 37b in the same direction causes the detection terminal 52b to come into contact with the detection land 51c, so that the rotation of one turn of the charge cam 37b is detected to stop the drive motor 15.

When the multiple exposure mode is selected, no rotation of the drive motor in the forward direction occurs. If the multiple exposure continues, the above-mentioned operations are repeated. When the multiple exposure is stopped, the drive motor 15 rotates in the forward direction to wind the film.

As can be understood from the foregoing, in the motor-driven camera according to the present invention, the multiple exposure can be easily effected by the control of the drive motor 15. However, the multiple exposure is not an essential function but an optional function in the camera of the present invention.

As can be seen from the above discussion, according to the present invention, since the winding of the film and the shutter charge are controlled by the forward and reverse rotations of the single common motor, if a high-power motor is used as the common motor, the shutter operation and the winding operation of the film can be effected at high speed. Therefore, since it is not necessary to use separate high-power motors for the shutter and the film winding, an inexpensive and high quality camera can be realized in the present invention.

Furthermore, according to the present invention, it is also possible to rewind the film by the single common motor which is adapted to perform the shutter operation and the film winding operation.

I claim:

1. A motor-driven camera comprising:
    a sun gear which is rotated in the forward and reverse directions in accordance with the rotation of a motor in the forward and reverse directions;
    a charge gear which is in mesh with a gear train of a shutter charge system;
    a winding gear which is in mesh with a gear train of a film winding system;
    a first rotatable planet gear mechanism which is provided around said sun gear to mesh with said winding gear in accordance with the rotation of the sun gear in one direction; and
    a second rotatable planet gear mechanism which is provided around said sun gear for movement independently of said first rotatable planet gear mechanism to mesh with said charge gear in accordance with the rotation of the sun gear in the other direction.

2. A motor-driven camera according to claim 1, wherein said first and second planet gear mechanisms rotate about first and second axes, wherein said first and second axes are coaxial to each other.

3. A motor-driven camera according to claim 1, further comprising a rewinding gear which is in mesh with a gear train of a film rewinding system, and wherein said second planet gear mechanism is selectively brought into mesh with said charge gear or said rewinding gear in accordance with the rotation of the sun gear in the forward and reverse directions.

4. A motor-driven camera according to claim 3, further comprising a first preventing means for preventing said second planet gear mechanism from engaging with said rewinding gear when the rewinding gear is rotated by said first planet gear mechanism, and a second preventing means for preventing said first planet gear mechanism from engaging with said winding gear when the rewinding gear is rotated by said second planet gear mechanism.

5. A motor-driven camera according to claim 4, wherein said second preventing means comprises a crank lever which is coaxially pivoted about the axis of said rewinding gear to rotate when the shutter charge is effected.

6. A motor-driven camera according to claim 4, wherein said first preventing means comprises a first planet lever which is provided on said first planet gear mechanism to rotate in the same direction as that of the sun gear.

7. A motor-driven camera according to claim 4, wherein said second preventing means comprises a second planet lever which is provided on said second planet gear mechanism to rotate in the same direction as that of the sun gear.

8. A motor-driven camera according to claim 1, wherein said motor rotates in the direction to transmit the rotation of the sun gear to the charge gear through the second planet gear mechanism when the shutter is released, said motor being reversed in the direction to transmit the rotation of the sun gear to the winding gear through the first planet gear mechanism when the shutter charge is completed by the rotation of the charge gear, and said motor stops rotating when the winding of the film is completed by the rotation of the winding gear.

9. A motor-driven camera according to claim 1, wherein said camera has a multiple exposure mode, and wherein, at the multiple exposure mode, said motor rotates in the direction to transmit the rotation of the sun gear to the charge gear through the second planet gear mechanism after the shutter is released and said motor is stopped when the shutter charge is completed by the rotation of the charge gear.

10. A motor-driven camera according to claim 9, wherein a shutter charge completion signal is generated in response to a detection signal of one-turn of said charge gear to control the forward rotation, the stopping and the reverse rotation of the motor.

11. A motor-driven camera according to claim 2, further comprising a detecting means for detecting the end of the film, so that the motor rotates in the direction to transmit the rotation of the sun gear to the charge gear through the second planet gear mechanism in response to the detecting signal of the film end and said motor is reversed when the shutter charge is completed by the rotation of the charge gear.

12. A motor-driven camera according to claim 11, wherein the shutter charge is effected by the rotation of the charge gear within a charge section defined by a part of one turn of the charge gear, so that the motor is reversed when a detection signal of the end of the charge section is detected.

13. A motor-driven camera according to claim 12, further comprising a preventing means for preventing the sun gear from engaging with the winding gear when the motor is reversed in accordance with the detection signal of the end of the charge section.

14. A motor-driven camera according to claim 13, wherein said preventing means comprises a crank lever which is coaxially pivoted to the rewinding gear to be rotated by the rotation of the charge gear within the charge section.

15. A motor-driven camera in which winding and rewinding operations of a film and a shutter charge are effected by a common motor, comprising;
a sun gear which is rotated in the forward and reverse directions in accordance with the rotation of the common motor in the forward and reverse directions;
a charge gear which is in mesh with a gear train of a shutter charge system;
a rewinding gear which is in mesh with a gear train of a film rewinding system;
a winding gear which is in mesh with a gear train of a film winding system;
a first rotatable planet gear mechansim which is provided around the sun gear to mesh with the winding gear in accordance with the rotation of the sun gear in one direction;
a second rotatable planet gear mechanism which is provided around the sun gear to selectively mesh with the charge gear or the rewinding gear in accordance with the rotatin of the sun gear in the forward or reverse direction;
a first preventing means for preventing the second planet gear mechanism from engaging with the rewinding gear when the film is wound by the winding gear; and,
a second preventing means for preventing the first planet gear mechanism from engaging with the winding gear when the film is rewound by the rewinding gear.

16. A motor driven camera, comprising:
a sun gear which is rotated in the forward and reverse directions in accordance with the rotation of a motor in the forward and reverse directions;
a charge gear which is in mesh with a gear train of a shutter charge system;
a winding gear which is in mesh with a gear train of a film winding system;
a rewinding gear which is in mesh with a gear train of a film rewinding system;
first and second planet levers which are rotatably mounted to the sun gear for rotation about respective first and second axes, said first and second axes being coaxial to each other;
first and second planet gears which are pivoted to the first and second planet levers to mesh with the sun gear, respectively;
said winding gear being in mesh with the first planet gear when the sun gear rotates in one direction;
said charge gear and said rewinding gear geing in mesh with the second planet gear when the sun gear rotates in one direction and the other direction, respectively;
first preventing means for preventing the second planet gear mechanism from engaging with the rewinding gear when the winding gear is in mesh with the first planet gear; and,
second preventing means for preventing the first planet gear mechanism from engaging with the winding gear when the rewinding gear is in mesh with the second planet gear.

* * * * *

UNITED STATES PATENT AND TRADEMARK OFFICE
CERTIFICATE OF CORRECTION

PATENT NO. : 5,105,212
DATED : April 14, 1992
INVENTOR(S) : Toshiyuki KITAZAWA

It is certified that error appears in the above-indentified patent and that said Letters Patent is hereby corrected as shown below:

On the cover, in section [57], Abstract, line 5, change "grain" to ---train---.

At column 10, line 21 (claim 15, line 21) change "rotatin" to ---rotation---.

At column 10, line 50 (claim 16, line 20) change "geing" to ---being---.

Signed and Sealed this

Fifth Day of September, 1995

Attest:

BRUCE LEHMAN

Attesting Officer      Commissioner of Patents and Trademarks